United States Patent Office 3,660,446
Patented May 2, 1972

---

3,660,446
NICKEL MONO-ALKYLPHOSPHITES AND DERIVATIVES
Jonathan T. Carriel, Ridgewood, N.J., and Joseph F. Anzenberger, St. Louis, Mo., assignors to The International Nickel Company, Inc., New York, N.Y.
No Drawing. Continuation of application Ser. No. 537,010, Mar. 24, 1966. This application Mar. 14, 1969, Ser. No. 808,378
Int. Cl. C07f 15/04
U.S. Cl. 260—439 R  5 Claims

ABSTRACT OF THE DISCLOSURE

Directed to a class of nickel compounds generally formulated as $Ni[(OP)(OR)(OH)]_2$ and $$L_2Ni[(OP)(OR)(OH)]_2$$

wherein R is an alkyl group containing from about 1 to about 12 carbon atoms and L is a ligand of the electron donor type coordinated to the nickel and to a method for preparing the compounds. The compounds have utility as nematocides.

---

This application is a continuation of application Ser. No. 537,010, filed Mar. 24, 1966, and now abandoned.

The present invention is directed to a new class of nickel organic compounds and to methods for preparing the same.

We have now discovered a route leading to the preparation of new nickel organic compounds having predictable structures and unique properties.

It is an object of the present invention to provide new complex nickel organic compounds having unique properties.

It is another object of the invention to provide a method leading to the preparation of the special nickel organic compounds having controlled predictable compositions.

Other objects and advantages of the invention will become apparent from the following description.

Generally speaking, the present invention is directed to a class of nickel compounds generally formulated as $$Ni[(OP)(OR)(OH)]_2 \text{ and } L_2Ni[(OP)(OR)(OH)]_2$$

in which R is an alkyl group containing from about 1 to about 12 carbon atoms and L is a ligand of the electron donor type coordinated to the nickel. The alkyl groups can have straight or branched carbon chains.

The special method for producing the aforementioned compounds as contemplated in accordance with the invention involves synthesis in a liquid medium under strictly non-aqueous conditions. Thus, the special method generally involves preparation of a mono-alkylphosphite intermediate having the desired alkyl grouping, for example, in the form of a potassium salt, and reacting the intermediate compound with a solution of a nickel compound in an organic medium from which water is excluded. The synthesis is conducted at substantially ambient temperatures and under substantially atmospheric pressure.

The intermediate compounds, for example, a potassium mono-alkylphosphite, may readily be prepared by dissolving potassium hydroxide in a non-polar medium such as toluene under refluxing and reacting the corresponding di-alkylphosphite with the potassium hydroxide solution with provisions to remove liquid water such as that associated with the potassium hydroxide source.

In order to give those skilled in the art a better understanding of the invention, the following illustrative examples are given:

EXAMPLE I

Potassium hydroxide pellets were slurried in toluene in proportion of about 525 milliliters of toluene for each mole of potassium hydroxide pellets at reflux temperature (about 110° C.) with the condensate passing through a Dean-Stark trap to remove liquid water. Nearly all of the potassium hydroxide dissolved. An equi-molar portion of di-2-ethylhexyl phosphite was added dropwise to the refluxing potassium hydroxide in toluene. Upon completion of the reaction, the temperature was reduced to ambient and the potassium salt of mono-ethylhexylphosphite was precipitated in good yield. For best results in filtration, the solution is allowed to cool slowly to form a more filterable potassium salt and cooling is carried to a temperature not exceeding about 5° C. to reduce solubility of the potassium salt in toluene. For example, the solution may be held overnight in an ice bath. The by-product ethylhexyl alcohol, which was soluble in toluene, was separated from the potassium salt upon filtration. Gas chromatography demonstrated that the ethylhexyl alcohol provided by the reaction corresponded quantitatively with the following reaction:

$$(RO)_2POH + KOH \rightarrow ROH + KOP(OH)(OR)$$

Elemental analysis of the potassium salt corresponded with the calculated analysis within experimental limitations. One mole of the potassium mono-ethylhexylphosphite thus prepared was reacted with 0.5 mole of nickel bromide di-methoxyethane complex ($NiBr_2 \cdot DME$) in dry di-methoxyethane (DME) at about 25° C. A slightly exothermic metathetical reaction ensued which resulted in the formation of a soluble green nickel compound and a precipitate of potassium bromide. Potassium bromide and DME were removed from the reaction products by stripping off the DME, taking up the residue in toluene, filtering and stripping off the toluene. The product was a pale yellow to brown waxy solid which analyzed well for nickel mono-ethylhexylphosphite.

EXAMPLE II

Nickel mono-butylphosphite was prepared in the same manner as that set forth in Example I with the exception that potassium mono-butylphosphite was employed as the starting material in the place of potassium mono-ethylhexylphosphite.

The products produced in accordance with Examples I and II were analyzed and the results compared with the calculated formulae for nickel mono-ethylhexylphosphite and nickel mono-butylphosphite, respectively, as shown in the following Table I:

TABLE I

|  | Percent |  |  |  |  |  |  |  |  |  |
|---|---|---|---|---|---|---|---|---|---|---|
|  | Calculated |  |  |  |  | Observed |  |  |  |  |
|  | C | H | P | Ni | O | C | H | P | Ni | O |
| Nickel mono-ethyl-hexyl-phosphite | 42.8 | 8.1 | 13.8 | 13.1 | 21.3 | 44.3 | 9.1 | 13.4 | 12.7 | [1] 20.5 |
| Nickel mono-butyl-phosphite | 28.8 | 6.1 | 18.6 | 17.6 | 28.8 | 26.2 | 5.4 | 15.2 | 17.5 | [1] 34.4 |

[1] Oxygen determined by difference.

The nickel mono-alkylphosphite as described hereinbefore may be reacted with ligands of the electron donor type, i.e., ligand molecules containing electron donors from the group phosphorus, oxygen and nitrogen, which coordinate to the nickel. In general, the preparation is effected by dissolving the nickel mono-alkylphosphites in a non-polar organic solvent such as benzene or hexane in the substantially complete absence of water and the ligand is added in solution. A color change is observed which, for example, may be from yellow to green and occasionally to a purple or maroon. Solid products may be precipitated by reducing the solvent concentration and/or by adding a non-solvent such as n-pentane. It is found that alcohols containing 1 to 12 carbon atoms, phosphines and phosphites are easily coordinated to nickel monoalkylphosphites. Thus, compounds such as 2-ethylhexanol, n-butanol, triphenylphosphite, tri-n-butyl phosphite, triphenyl phosphine, tri-n-butyl phosphine, etc., will ligand in accordance with concepts of the present invention. With special reference to Example I, nickel mono-2-ethylhexyl phosphite coordinated to 2-ethylhexyl alcohol can be prepared simply by omission of the first filtering step.

The following liganded compounds were prepared and the properties thereof are given in the following Table II:

TABLE II

| Compound No. | Compound | Color | State |
|---|---|---|---|
| 3 | Bis (2-ethylhexanol) nickel mono-2-ethylhexylphosphite $(C_8H_{17}OH)_2Ni[OP(OC_8H_{17})(OH)]_2$ | Yellow-green. | Liquid. |
| 4[1] | Bis(triphenyl phosphine) nickel mono-2-ethylhexylphosphite $[P(C_6H_5)_3]_2Ni[OP(OC_8H_{17})(OH)]_2$ | Green | Solid. |
| 5 | Bis(2-ethylhexylphosphite) nickel mono-2-ethylhexylphosphite $[P(OC_8H_{17})_3]_2Ni[OP(OC_8H_{17})(OH)]_2$ | Purple | Liquid. |
| 6 | Bis(triphenylphosphite) nickel mono-2-ethylhexylphosphite $[P(OC_6H_5)_3]_2Ni[OP(OC_8H_{17})(OH)]_2$ | Yellow | Do. |
| 7 | Bis(tri-n-butylphosphite) nickel mono-2-ethylhexylphosphite $[P(OC_4H_9)_3]_2Ni[OP(OC_8H_{17})(OH)]_2$ | Maroon | Do. |
| 8 | Bis(butanol) nickel mono-butylphosphite $[HOH_9C_4]_2Ni[OP(OC_4H_9)(OH)]_2$ | Yellow-green. | Do. |
| 9 | Bis(tri-n-butyl phosphine) nickel mono-butylphosphite $[P(C_4H_9)_3]_2Ni[OP(OC_4H_9)(OH)]_2$ | Marron | Do. |
| 10 | Bis(triphenyl phosphine) nickel mono-butylphosphite $[P(C_6H_5)_3]_2Ni[OP(OC_4H_9)(OH)]_2$ | Green | Solid. |

[1] Melting point 215° C.-216° C.

It is essential in carrying out the invention that water be excluded from the reaction medium as otherwise hydrolysis of the alkyl group of the phosphite ester occurs and it is not possible to produce predictable results under such conditions. Another preparative pitfall to be avoided is that of alcohol-ester exchange. Thus, when a lower alcohol is used as a solvent, the lower alcohol appears to exchange with the alkoxide group present in the esterified phosphite grouping. Since solvent alcohol will also coordinate with the nickel in the nickel monoalkylphosphite, such alcohol-ester exchange will also lead to mixed products of the same type but of unpredictable composition.

Desired properties of the resulting compound such as oil solubility or solubility in other media can be controlled by control of the liganded groups. For example, nickel mono-2-ethylhexylphosphite coordinated with 2-ethylhexanol readily dissolves in various types of polymers. Nickel mono-butylphosphite and nickel mono-2-ethylhexylphosphite have been demonstrated to possess marked nematocidal activity. Thus, the activity of the aforementioned compounds was ascertained at a standard in vitro biological screening test against the nematode *Meliodogyna hapla* using standard techniques with the following results:

TABLE III

| Compound | Dose, p.p.m. | Percent mortality 1 day | 3 days | 5 days |
|---|---|---|---|---|
| Nickel mono-butyl-phosphite | 500 | 99 | 100 | 100 |
|  | 50 | 40 | 100 | 100 |
|  | 5 | 0 | 25 | 35 |
| Nickel mono-2-ethyl-hexylphosphite | 500 | 97 | 100 | 100 |
|  | 50 | 20 | 100 | 100 |
|  | 5 | 0 | 90 | 100 |
| 1,2-dichloro, 3 bromo-propane | 500 | 100 | 100 | 100 |
|  | 50 | 3 | 5 | 20 |
|  | 5 | 0 | 0 | 0 |

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:
1. The process for preparing a nickel mono-alkylphosphite $Ni[(OP)(OR)(OH)]_2$ wherein R is an alkyl group containing 1 to 12 carbon atoms which comprises reacting a di-alkyl phosphite with an alkali hydroxide with provision for removal of any water present from the reaction medium to form an alkali metal mono-alkylphosphite and a by-product alcohol, separating the reaction products and reacting the alkali metal mono-alkylphosphite with nickel bromide dimethoxyethane complex

(NiBr$_2$·DME)

in molar proportions of said phosphite to nickel of about 2:1 under essentially anhydrous conditions to form nickel mono-alkylphosphite.

2. A compound having the structural formula

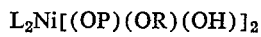

$L_2Ni[(OP)(OR)(OH)]_2$ wherein R is an alkyl group containing 1 to 12 carbon atoms and L is a ligand selected from the group consisting of alcohols having about 1 to about 12 carbon atoms, triphenyl and tri-n-butyl phosphines and triphenyl and tri-n-butyl phosphites.

3. A compound according to claim 2 wherein L is an alcohol.

4. The process for preparing a coordinated nickel mono-alkylphosphite $L_2Ni[(OP)(OR)(OH)]_2$ wherein R is an alkyl group containing 1 to 12 carbon atoms and L is a ligand from the group consisting of alcohols containing 1 to 12 carbon atoms, tri-n-butyl and triphenyl phosphites and tri-n-butyl and triphenyl phosphines which comprises dissolving a nickel mono-alkylphosphite in a non-polar organic solvent in the substantially complete absence of water and adding the ligand in solution.

5. The process according to claim 4 wherein L is an alcohol.

References Cited

UNITED STATES PATENTS

| 3,395,112 | 7/1968 | Kauder | 260—45.75 |
| 2,346,155 | 4/1944 | Denison et al. | 252—32 |
| 2,432,095 | 12/1947 | Frey | 252—46.7 |
| 3,412,118 | 11/1968 | Kujawa et al. | 260—429 |

OTHER REFERENCES

Kosolopoff Organo-Phosphorous Compounds, John Wiley & Sons, Inc. New York, N.Y. 1950, p. 188.

JAMES E. POER, Primary Examiner

A. P. DEMERS, Assistant Examiner

U.S. Cl. X.R.

260—45.75 N, 999